United States Patent [19]

Babcock et al.

[11] Patent Number: 5,288,439

[45] Date of Patent: * Feb. 22, 1994

[54] METHOD OF INSTALLING A POST

[75] Inventors: H. Nash Babcock, Old Greenwich; Edward P. Holub, Trumbull, both of Conn.

[73] Assignee: Nomix Corporation, Fairfield, Conn.

[*] Notice: The portion of the term of this patent subsequent to Jun. 13, 2006 has been disclaimed.

[21] Appl. No.: 518,040

[22] Filed: May 2, 1990

Related U.S. Application Data

[60] Continuation-in-part of Ser. No. 199,556, May 27, 1988, Pat. No. 5,108,790, which is a continuation-in-part of Ser. No. 101,908, Sep. 28, 1987, Pat. No. 4,839,115, which is a division of Ser. No. 53,561, May 21, 1987, Pat. No. 4,732,782, which is a continuation-in-part of Ser. No. 843,316, Mar. 24, 1986, abandoned, and a continuation-in-part of Ser. No. 168,715, Mar. 16, 1988, Pat. No. 5,219,222, and a continuation-in-part of Ser. No. 49,906, May 15, 1987, Pat. No. 4,747,878.

[51] Int. Cl.$^5$ .............................................. E04B 1/16
[52] U.S. Cl. ........................................ 264/32; 264/34; 264/35; 264/122; 264/333; 405/267
[58] Field of Search ................ 264/32, 34, 35, 333, 264/109, 122, 42, DIG. 43, 240, 219, 299, 334; 427/427, 180, 181, 140, 136, 403, 397.7; 52/742; 405/266, 267, 222-224; 106/85, 89, 97

[56] References Cited

U.S. PATENT DOCUMENTS

| | | |
|---|---|---|
| 188,123 | 3/1877 | Goodridge, Jr. ................. 405/222 |
| 358,853 | 3/1877 | Goodridge, Jr. ................. 405/222 |
| 722,782 | 3/1903 | Weaver . |
| 743,525 | 11/1903 | Lake ..................... 264/DIG. 43 X |
| 930,086 | 8/1909 | Reed ................................ 366/9 |
| 1,029,126 | 6/1912 | Hoover . |
| 1,047,680 | 12/1912 | Mills et al. . |
| 1,107,237 | 8/1914 | Smith . |
| 1,391,678 | 9/1921 | Francois ........................ 405/266 |
| 1,473,990 | 11/1923 | Huber . |
| 1,476,938 | 12/1923 | Walper ........................... 264/212 |
| 1,920,463 | 8/1933 | Edwards . |

(List continued on next page.)

FOREIGN PATENT DOCUMENTS

| | | | |
|---|---|---|---|
| 726570 | 1/1966 | Canada ............................... 259/36 |
| 385212 | 12/1923 | Fed. Rep. of Germany ........ 80 B/1 |
| 621902 | 11/1935 | Fed. Rep. of Germany ....... 84 C/2 |
| 6945484 | 4/1969 | France . |
| 793627 | 1/1981 | U.S.S.R. ........................ B01F 13/02 |
| 893247 | 12/1981 | U.S.S.R. .......................... B01L 3/00 |
| 1234192 | 5/1986 | U.S.S.R. ............................ 264/333 |
| 853624 | 11/1960 | United Kingdom ............. 86/B01F |

OTHER PUBLICATIONS

Quikrete Hydraulic Cement bag.
Build And Repair With Concrete, The Complete Do-It-Yourself Manual, The Quikrete Companies, 1986, pp. 21-22.

(List continued on next page.)

Primary Examiner—Karen Aftergut
Attorney, Agent, or Firm—Weingram & Zall

[57] ABSTRACT

A method of installing a post in a post hole includes the steps of providing a dry fast setting cementitious composition having a set time and in the form of finely divided particles of at least one cement binder, and pouring an amount of the dry cementitious composition into a volume of water located in a post hole without any type of physical mixing of the cementitious composition and water other than the mixing which occurs merely by applying the cementitious composition into the water. The major portion of the particles of the cementitious composition have approximately the same drop rate through the volume of water. The water contacts the dry cementitious composition when poured into the volume of water to hydrate the particles of the dry cementitious composition, the particles of cementitious composition dropping through the water to displace excess water and form the hydrated cementitious composition into a substantially non-segregated mass. The hydrated cementitious composition is then allowed to set and cure to a solid mass for at least the set time, e.g., less than ten minutes.

16 Claims, No Drawings

U.S. PATENT DOCUMENTS

| | | | |
|---|---|---|---|
| 2,138,172 | 11/1938 | Johnson. | |
| 2,306,962 | 12/1942 | Kropp | 259/11 |
| 3,088,713 | 5/1963 | Gard | 366/160 |
| 3,582,376 | 6/1971 | Ames | 106/90 |
| 3,665,720 | 5/1972 | Havno | 61/46 |
| 3,682,676 | 8/1972 | Karrh et al. | 427/204 |
| 3,683,760 | 8/1972 | Silva | 264/333 X |
| 3,725,105 | 4/1973 | Chase | 427/140 |
| 3,730,763 | 5/1973 | Schlottmann et al. | 117/104 R |
| 3,745,775 | 7/1973 | Kahn | 405/222 |
| 3,825,433 | 7/1974 | Arnaldi et al. | 106/809 |
| 3,914,359 | 10/1975 | Bevan | 264/DIG. 43 X |
| 3,922,832 | 12/1975 | Dicker | 52/742 |
| 3,927,163 | 12/1975 | Gabriel, et al. | 264/DIG. 43 X |
| 3,955,992 | 1/1976 | Roberts | 106/90 |
| 4,042,407 | 8/1977 | Natsuume | 106/90 |
| 4,086,663 | 4/1978 | Croft | 366/154 |
| 4,129,449 | 12/1978 | Kojima | 106/95 |
| 4,175,867 | 11/1979 | Piazza | 366/9 |
| 4,243,696 | 1/1981 | Toth | 427/204 |
| 4,301,763 | 11/1981 | Goldstone et al. | 427/180 |
| 4,366,209 | 12/1982 | Babcock | 428/446 |
| 4,367,986 | 1/1983 | Miyoshi et al. | 405/226 |
| 4,374,672 | 2/1983 | Funston et al. | 106/97 |
| 4,390,372 | 6/1983 | Hardin | 106/90 |
| 4,461,856 | 7/1984 | Willis et al. | 523/401 |
| 4,472,201 | 9/1984 | Ochi et al. | 106/98 |
| 4,487,633 | 12/1984 | Sakuta et al. | 106/90 |
| 4,504,315 | 3/1985 | Allemann et al. | 106/89 |
| 4,732,781 | 3/1988 | Babcock et al. | 427/140 |
| 4,732,782 | 3/1988 | Babcock et al. | 427/180 X |
| 4,747,878 | 5/1988 | Babcock et al. | 106/692 X |
| 4,772,326 | 9/1988 | Heinen et al. | 106/85 |
| 4,839,115 | 6/1989 | Babcock et al. | 264/109 X |

OTHER PUBLICATIONS

Quikrete Hydraulic Water-Stop, Instant-Plub Cement container.
Quikrete Quick-Setting Cement container.
Quikrete Construction Products brochure, 1987.
Quikrete rapid Raod Repair brochure, 9184.
Gifford-Hill, Non-Shrink Grouts brochure, 1988.
Master Builders, Master Flow 713 Grout brochure, 1987.
Genstar Building Materials, Concrete Repair Center, brochure.
Gifford-Hill Supreme Pre-Mixed Non-Shrink Grout bag.
Master Builders Master Flow 713 Grout bag.
Set, Quick Post.
Quikrete, Quikrete Pavement Company, Quikrete ® Do-It-Yourself Series, Setting Posts and Mixes and Their Uses (Prewetting)(3 pgs).
Y. Nakahra, N. Kvrumada, T. Arai and I. Vesugi. "The Prepackaged Concrete in Water, Using Artificial Extremely Fine Sand," The Cement Assoc. of Japan.
Sakrete ®, Save with Sakrete Products Brochure (4 pgs.).
Sakrete ®, 15 Easy Steps to Greater Home Enjoyment Booklet, (3 pgs.).
Sakrete ®, 11. Children's Play Yard.
Quikrete ®, Handyman . . . Complete Guide to Home Maintenance (4 pgs.).
Quikrete ®, Do it Yourself Proljects with Cement Mixes Brochure (2 pgs:)(3 quart brochure).
Quikrete ®, Do It Yourself Series on Wet or Leaking Basement Walls (2 pgs.).
Sakrete 50th Anniversary Brochure (1986).
The King of Concrete Article (Jul. 1986, World Fence News).
Set Consumer Products Inc. "Set . . . Hold It".
1950's Film -Popeye Cartoon.
Sat-Base II, Rapid Cure Cement Bag.
Quikrete, Rapid Road Repair Bag.
Quikrete, Quick Setting Cement Bag.
Quikrete, Post Concrete Mix Bag.
Sakrete's Project Booklet.

METHOD OF INSTALLING A POST

RELATED APPLICATIONS

This application is a continuation-in-part application of U.S. Ser. No. 199,556 filed May 27, 1988, now U.S. Pat. No. 5,108,790, which is a continuation-in-part of U.S. Ser. No. 101,908 filed Sep. 28, 1987, now U.S. Pat. No. 4,839,115, which is a divisional of U.S. Pat. Ser. No. 053,561 filed May 21, 1987, now U.S. Pat. No. 4,732,782, which is a continuation-in-part of U.S. Ser. No. 843,316 filed Mar. 24, 1986, now abandoned. This application is also a continuation-in-part of U.S. Ser. No. 07/168,715 filed Mar. 16, 1988, now U.S. Pat. No. 5,219,222 which is (a) a continuation-in-part of application U.S. Ser. No. 07/053,561, filed May 21, 1987, now U.S. Pat. No. 4,732,782, which is a continuation-in-part of U.S. Ser. No. 06/843,316, filed Mar. 24, 1986, now abandoned; and (b) a continuation-in-part of U.S. Ser. No. 07/049,906, filed May 15, 1987, now U.S. Pat. No. 4,747,878, which is a division of U.S. Ser. No. 07/843,316 filed Mar. 24, 1986, now abandoned. All of the foregoing applications and patents are incorporated herein by reference.

BACKGROUND OF THE INVENTION

At present, it is essential that all cementitious compositions are mixed with water before placement in order to obtain the proper characteristics of the final product. Some type of mixing is and has always been required. Some manufactures of premixes, usually in a container having instructions thereon, have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components with water.

SUMMARY OF THE INVENTION

The present invention relates to dry cementitious compositions which have finely divided particles of at least one cement binder. The composition is usually in a container, e.g. a bag having instructions associated therewith. The cement may be Portland cement, gypsum, high aluminum cement, or mixtures thereof, but not restricted thereto. Magnesium phosphate or other fast-setting compounds may also be used. The major proportion of particles have approximately the same drop rate in water, so that when poured through water according to the invention, the material does not appreciably segregate.

These compositions may further include a filler component of sand or aggregate particles, provided that the major portion of those particles have a drop rate in water which is approximately the same as the cement particles. Also, the cementitious mixture should be able to absorb and/or combine with water in the amount approximately 50% by volume. The higher the amount of water the cementitious mixture can tolerate, the better the finished product.

It is possible to use other additives in these compositions. Such additives may include, but are not limited to, accelerators, water reducing compounds, waterproofing agents, polymers, drying shrinkage inhibitors, wet shrinkage inhibitors, lime, pigments and the like, and may be added to improve or impart a particular property to the composition.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogenous consistency.

The invention also contemplates various methods for installing cement products upon a substrate which comprises saturating the substrate with an amount of water which is substantially in excess of the normal amount of dry components which are subsequently added. The dry powder is added without mixing in manner such that it combines with a portion of the water and displaces the remainder of the water. The applied combination is then allowed to cure to a final product.

Specific methods are presented hereinbelow, particularly a method for installing a post in a post hole.

DETAILED DESCRIPTION OF THE PREFERRED EMBODIMENTS

This invention relates to dry cementitious compositions which are poured, trowled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

By the term "fast setting" it is meant a cementitious composition which sets faster than the most common Portland cement, i.e., type I or type II.

By "cement binder" what is meant is a material, usually of a cementitious nature, which sets or cures upon contact with the hydration by water to form a solid mass which is useful for forming blocks, shapes, structures, walls, floors, or other surfaces for use as a supporting or load bearing member. The cement binder may be used alone or with various additives and fillers, usually sand or aggregate, to form the desired member after setting and curing. In addition to the well known cement binders, such as Portland cement, aluminous cement, gypsum and its variations, magnesium phosphate cements and the like, other materials, such as the silicates, are also contemplated as being within the scope of this term since they perform in a manner similar to the cements. Aluminum silicate is a specific example of this type material, and it is used for speciality applications due to its relatively high cost compared to the other cement materials previously mentioned.

When the formulations of these cementitious compositions are properly controlled, the problems of thorough wetting of the cement without overwetting, of segregation of components, and of loss of compressive strength of the cured product are greatly reduced or eliminated.

Where cement coatings are desired, the surface area to be coated is first pre-wetted and saturated with water. The dry cementitious mixture is placed on the surface, instantly reacting with the wet surface. If additional layers or a greater thickness of the coating is needed, the first cement layer can be pre-wetted and the dry composition sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious composition, and the composition is then allowed to cure. This provides a fast, simple installation of cement without the need for tools, mixing apparatus, water measurement aids or the like. For floor leveling, for example, the floor can be flooded to form puddles in low areas. The dry cementitious composition is then sprinkled in the areas where puddles are formed, and allowed to cure. Thus, the floor is easily levelled by this procedure.

Controlling the rate of hydration may lead to many applications. For instance, for coating vertical surfaces, a very fast setting material can be used to eliminate the problems of running, sagging or failure to bond. Where mortar for bricklaying is desired, a material with a longer set time will allow the operator sufficient time to work with the material. For situations where the surface particles have not been properly wetted, additional water may be applied to the surface for more activation and further finishing. Preferred set times for installing posts are less than about 10 minutes and, where desirable less than about 5 minutes.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tube, or pothole and then the dry cementitious material may be placed by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used.

For the placement of concrete foundations, a hole is first prepared, then filled with the required amount of water. If desired, forms can be used to help contain the water. The dry material can then be poured directly into the foundation area to the desired height, thus displacing the excess water, if any. After the material cures, the foundation is complete.

For installing a post, a post hole is provided and a post is located therein. An amount of water, in excess of that needed to hydrate an amount of cementitious composition is provided. The cementitious composition is poured through the water, the excess water being displaced by the cementitious composition. The cementitious composition is then allowed to cure to a substantially non-segregated mass. Additional cement may be added to absorb a portion of the excess water.

In certain circumstances, a cavity, e.g. a post hole having a post therein, could have a small percentage of water placed into it and then the first part of the cementitious mixture placed into the water. While this placement is taking place, additional water could then be placed into the hole by various methods simultaneously with the placement of the rest of the cementitious mixture. When the final quantity of the cementitious mixture is reached, the entire surface area could be sprayed for trowling or other finishing purposes as could be done when the entire mixture is poured through water.

In the situation where the cavity or hole is porous and cannot hold water, it is possible to thoroughly wet the surfaces of the hole and then introduce a fast setting cementitious mixture into the hole to partially seal the surfaces of the hole to retain water. It is then possible to pour water into the lined hole and proceed as above.

The control of density and size of the dry components and the rate of drop through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious particles to form a homogeneous mixture.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The system can be used with any normal additives acceptable to the specific composition. In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination.

The examples show the success of adding cementitious compositions to water after the water is in place.

When dry, pre-blended materials are used, there is a much greater potential for higher quality finished product.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so forth can be used.
6. All types of chemical cements, even with water soluble parts, can be used.
7. No wet mixing or blending equipment is required.

8. No addition of water to cementitous mixes is required before placement, thus avoiding clean up of equipment and waste.
9. When placements under deep water conditions where tremes, elephant trunks or pipes would be required, the material under this formula can be placed dry in the tube and activated by available water at the end of the line, thus keeping all conveyances clear or wet cement.
10. When cement contents are too low in mixtures to prevent proper strength development or prevent over-absorption of water, resulting in weak or segregated mixes, more cement may be added, or water absorption material may be added, to prevent excess water from decreasing the quality of the mix.

Present cement mixes with less than 20 percent by weight of a cementitious binder should have some additional water absorption agent in the mix to prevent overwatering and segregation. Ideally, cementitious compositions of the mixtures should have the maximum amount of water absorbency possible. The higher the ratio of chemical bonded water to the binder, the better and more versatile a product will be achieved.

Cementitious mixtures containing more than 20 percent by weight cement may or may not need additional cement or water absorbers, depending on the application. Generally, at least 35 percent by weight of a cement binder is preferred for use in the composition and methods of this invention.

While using liquids other than water, such as two component thermosetting organic compounds, an aggregate or sand can be dropped through the liquid or chemicals, causing the final mixture to be blended by gravity or by the solid ingredients passing through the liquid, which will result in a hardened mass of aggregate or sand and chemical.

EXAMPLES

The scope of the invention is further described in connection with the following examples which are set for the sole purpose of illustrating the preferred embodiments of the invention and which are not to be construed as limiting the scope of the invention.

In the examples that follow, the components of each cementitious composition were manufactured of finely divided particles having substantially the same drop rate in water, so that the advantages previously discussed could be achieved.

The first 9 of the following examples are cementitious materials that were poured into a 4"×8" cylinder which was filled with water. The material was poured until it reached a level of about ½" below the top of the cylinder. The cementitious material was then allowed to cure. The results are described in Table I.

EXAMPLE 1

| Substance (common sand/cement mix) | Percentage |
|---|---|
| Portland Cement Type I | 20% |
| Sand | 80% |

Set time is 20 hours.
Compressive strength at 24 hours is 0.0 psi (too little cement)

EXAMPLE 2

| Substance | Percentage |
|---|---|
| Portland Cement Type I | 90% |
| Sand | 10% |

Set time 12 hours.
Compressive strength at 24 hours is 1,100 psi.

EXAMPLE 3

| Substance | Percentage |
|---|---|
| Portland Cement Type I | 50% |
| Sand | 50% |

Set time 16 hours.
Compressive strength at 24 hours is 600 psi.

EXAMPLE 4 (Comparative Example)

| Substance | Percentage |
|---|---|
| Portland Cement Type I | 50% |
| Pea Gravel | 50% |

Set time 16 hours.
Compressive strength at 24 hours is 0.0 psi. (different drop rates).

EXAMPLE 5

| Substance | Percentage |
|---|---|
| Portland Cement Type II | 50% |
| Plaster of Paris | 50% |

Set time is 10 minutes.
Compressive strength at 24 hours is 1,600 psi.

EXAMPLE 6

| Substance | Percentage |
|---|---|
| High Alumina Cement | 80% |
| Sand | 20% |

Set time is 12 hours.
Compressive strength at 24 hours is 1,100 psi.

EXAMPLE 7

| Substance | Percentage |
|---|---|
| High Alumina Cement | 20% |
| Sand | 80% |

Set time is 20 hours.
Compressive strength at 24 hours is 0.0 psi. (too little cement).

EXAMPLE 8

| Substance | Percentage |
|---|---|
| High Alumina Cement | 25% |
| Portland Cement Type III | 25% |
| Lithium Carbonate | 1% |
| Sand | 49% |

Set time is 5 minutes.
Compressive strength at 24 hours is 1,100 psi.

EXAMPLE 9

| Substance | Percentage |
|---|---|
| Magnesium Oxide | 30% |
| Ammonium Phosphate | 10% |

-continued

EXAMPLE 9

| Substance | Percentage |
| --- | --- |
| Sand | 60% |

Set time is 5 minutes.
Compressive strength at 24 hours is 1,100 psi.

EXAMPLE 10

A test was run wherein the resin and hardener were of approximate equal density in an epoxy formulation. The resin and hardener were poured into a container without premixing, then the aggregate was dropped through the resin and hardener, forming a homogeneous mixture which set into a hardened mass. The formulas given below.

| Substance | Percentage |
| --- | --- |
| Resin: | |
| Dow DER 331 Epoxy Resin | 13.1% |
| Furfural Alcohol | 3.3% |
| Hardener | |
| Dow DEH 58 Diethylene Triamine modified with Bisphenol A | 3.5% |
| E6TPP Borg Warner Triphenyl Phosphate | 3.5% |
| Sand | 76.6% |

Set time is 30 minutes.
Compressive strength at 24 hours is 1,500 psi.

This test illustrates that various two component thermosetting organic materials can be applied without mixing. Such materials include polyesters, epoxies, polyurethanes and others. According to the invention, the resin and hardener are formulated into portions of substantially similar or identical densities, then poured into place without premixing. Then, the introduction of an additive or filler, such as sand or aggregate, into the poured materials, blends these components to a homogeneous mixture which is capable of curing to a hardened mass.

While is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed:

1. A method of installing a post in a post hole comprising:
    a) providing a dry fast setting cementitious composition having a set time, the cementitious composition being in the form of finely divided particles, the cementitious composition comprising at least one cement binder;
    b) providing a post hole;
    c) locating a post in the post hole;
    d) providing a volume of water in the post hole;
    e) pouring an amount of dry cementitious composition into the volume of water, the volume of water being greater than the amount necessary for hydration of the poured amount of cementitious composition,
       the water contacts the particles of the cementitious composition and hydrates the particles, and the major portion of the particles of the cementitious composition have approximately the same drop rate through the volume of water;
    f) allowing the cementitious composition to drop through the water, displacing the excess water as a result of the dropping of the cementitious composition; and
    g) allowing the hydrated cementitious composition to form into a cured substantially non-segregated mass.

2. A method of installing a post in a post hole comprising:
    a) providing a dry fast setting cementitious composition having a set time, the cementitious composition being in the form of finely divided particles, the cementitious composition comprising at least one cement binder;
    b) providing a post hole;
    c) locating a post in the post hole;
    d) providing a volume of water in the post hole;
    e) pouring an amount of dry cementitious composition into the volume of water without any type of physical mixing of the cementitious composition and water other than the mixing which occurs merely by applying the cementitious composition into the water,
       the major portion of the particles of the cementitious composition having approximately the same drop rate through the volume of water, and the water contacting the dry cementitious composition when poured into the volume of water to hydrate the particles of the dry cementitious composition, the particles of the cementitious composition dropping through the water to displace excess water and form the hydrated cementitious composition into a substantially non-segregated mass; and
    f) allowing the hydrated cementitious composition to set and cure to a solid mass for at least the set time.

3. A method of installing a post in a post hole comprising:
    a) providing a dry fast setting cementitious composition in a form of finely divided particles, the cementitious composition comprising at least one cement binder, the cementitious composition having a set time;
    b) providing a post hole;
    c) locating a post in the post hole;
    d) providing a volume of water in the post hole;
    e) pouring the dry cementitious composition into the volume of water, the water being in an amount more than that required to hydrate the amount of dry cementitious material poured therein,
       the major portion of the particles of the cementitious composition having approximately the same drop rate through the volume of water, so that the water contacting the particles of cementitious composition hydrates the particles as the particles drop through the water;
    f) allowing the cementitious composition to drop through the water displacing the excess water as a result of the dropping of the cementitious composition; and
    g) allowing the hydrated cementitious composition to form into a cured substantially non-segregated mass.

4. The method of claim 1, 2 or 3, wherein the set time is less than about ten minutes.

5. The method of claim 1, 2 or 3, wherein the set time is about ten minutes.

6. The method of claim 1, 2 or 3, wherein the set time is less than about five minutes.

7. The method of claim 1, 2 or 3, wherein the set time is about five minutes.

8. The method of claim 1, 2 or 3, wherein the cement binder is present in at least about 20 weight percent of the composition of the cementitious composition.

9. The method of claim 1, 2 or 3, wherein the cement binder is Portland cement, gypsum, high aluminum cement, magnesium phosphate or a combination thereof.

10. The method of claim 1, 2 or 3, wherein the composition further comprises an amount of a filler component to provide a mixture having at least about 35 percent by weight of cement binder; said filler component in the form of particles, the major portion of which have approximately the same drop rate as the cement particles.

11. The method of claim 10, wherein the filler component is sand or aggregate.

12. The method of claim 1, 2 or 3, further comprising a filler component of sand or aggregate.

13. The method of claim 1, 2 or 3, wherein the cementitious composition is dry blended to a homogeneous consistency.

14. The method of claim 1, 2 or 3, further comprising adding a sufficient amount of additional cement to absorb a portion of the excess water.

15. The method of claim 1, 2 or 3, further comprising at least one of an accelerator, water reducing compound, pumping aid, water absorbing compound, water proofing agent, polymer, wet expansion inhibitor or drying shrinkage inhibitor to impart a specific property to the composition.

16. The method of claim 1, 2 or 3, wherein the cement binder is present in an amount of at least 35 percent by weight.

* * * * *